United States Patent [19]

Posso

[11] Patent Number: 4,723,179

[45] Date of Patent: Feb. 2, 1988

[54] VIDEO TAPE CASSETTE WITH LOCKING FLAP ASSEMBLY

[76] Inventor: Patrick P. P. Posso, Avenue de la Gare 5, 1001 Lausanne, Switzerland

[21] Appl. No.: 715,156

[22] Filed: Mar. 22, 1985

[30] Foreign Application Priority Data

Apr. 10, 1984 [FR] France .................................. 84 05639

[51] Int. Cl.⁴ ...................... G11B 23/02; G11B 15/32; G11B 23/04; G03B 1/04
[52] U.S. Cl. ..................................: 360/132; 360/137; 360/90; 206/389; 242/198
[58] Field of Search ................ 242/198, 199; 206/389; 360/132, 137, 90

[56] References Cited

U.S. PATENT DOCUMENTS

| | | | |
|---|---|---|---|
| 3,809,219 | 5/1974 | Esashi | 242/198 |
| 4,187,998 | 2/1980 | Okamura et al. | 242/199 |
| 4,323,207 | 4/1982 | Gebeke | 360/132 |
| 4,466,583 | 8/1984 | Giannis et al. | 242/198 |
| 4,485,989 | 12/1984 | Ogiro et al. | 242/198 |
| 4,504,028 | 3/1985 | Goto | 360/132 |
| 4,524,927 | 6/1985 | Sieben | 242/198 |
| 4,564,120 | 1/1986 | Pertzch et al. | 242/198 |

Primary Examiner—John H. Wolff
Assistant Examiner—Alfonso Garcia

[57] ABSTRACT

A cassette comprising a housing made of two portions having a front surface provided with an aperture through which access can be had to the video tape, this aperture being closed by a flap/hingedly mounted to the cover. This flap is locked by a bolt consisting of a lever of synthetic material molded integrally with a resilient arm acting as a return spring and which is engaged by a notch on a lower boss on which it is held by a boss rigid with the cover. The lock can be introduced freely into its recess and positioned automatically when fitting the cover. The release is obtained in the known manner through a window.

4 Claims, 5 Drawing Figures

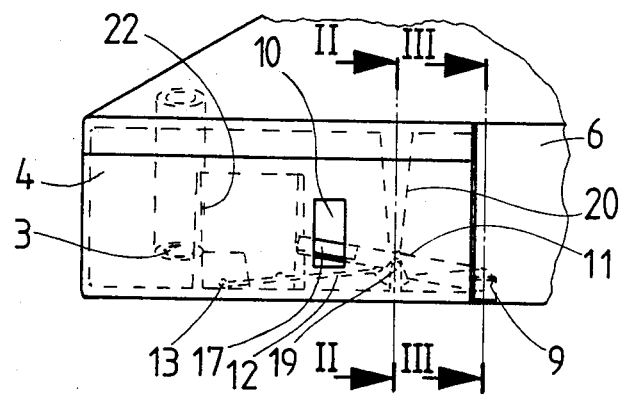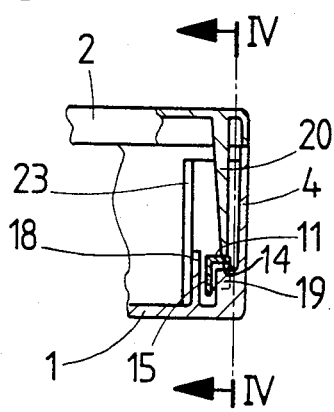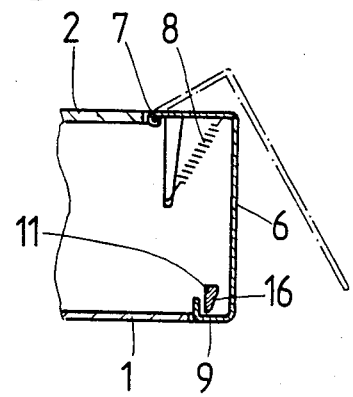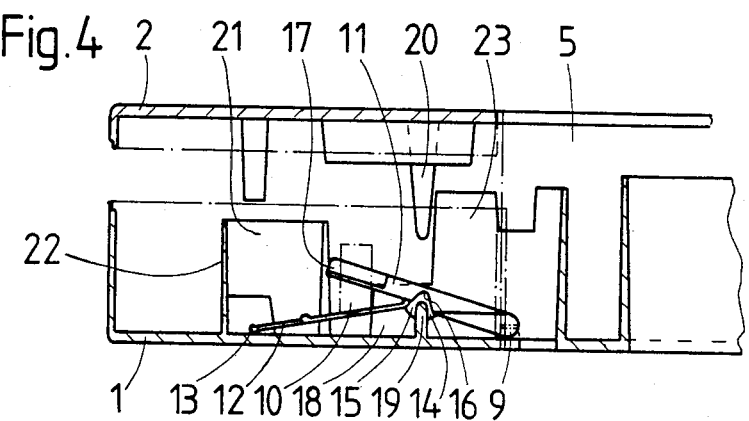

VIDEO TAPE CASSETTE WITH LOCKING FLAP ASSEMBLY

FIELD OF INVENTION

The present invention relates to a cassette for video tapes, adapted to receive two spools supporting a magnetizable tape transferable from one spool to the other spool, which comprises a housing consisting of a lower, cup-shaped portion and of a cover secured to the lower portion and provided with a flat front surface having an aperture constituting an access to the tape for recording or reading purposes which is closed by a flap hinged to one of the housing portions and responsive to resilient means constantly urging said flap to its closed position, and means for locking the flap in its closed position which comprise a bolt located between said front surface of said housing and an auxiliary inner wall, said bolt being formed integrally with a resilient arm reacting against one portion of said housing and constantly urging said bolt for engagement with a retaining portion of the flap, said front surface further comprising an orifice registering with said bolt for inserting the automatic release stud of a reading or recording apparatus.

PRIOR ART

A cassette of this type is known from the U.S. Pat. No. 4,323,207. In this prior art cassette, the bolt has the configuration of a sliding frame rigid with a curved resilient arm acting as a compression spring known from a prior art construction. To insert this sliding bolt into its recess the resilient arm must be bent by exerting a lateral thrust against the bolt. This requirement makes it difficult to set the bolt automatically into the housing. On the other hand, the frame and the resilient arm of the bolt constitute a loop and hook assembly likely to cause component elements to catch one another when they are deposited loosely into the cassette before its assembly. Moreover, the lateral movement of the bolt is attended by a lateral reaction force exerted on the release stud of the recording/reading apparatus. Now, in existing apparatus, this stud consists of a vertical blade which is therefore exposed to a bending effort.

SUMMARY OF THE INVENTION

The present invention provides a lock free of the above-mentioned inconveniences, that is, adapted to be easily fitted in position in an automatic machine, without any risk of catching other locking means before assembly, when the lock lies in a box of hopper.

To this end, the cassette according to the invention is characterised in that the bolt consists of a lever provided with a resilient arm substantially rectilinear when free of any stress, said lever being maintained intermediate its ends between a boss formed on the lower portion of the housing so as to constitute a fulcrum means for pivoting about an axis perpendicular to said front surface, and a boss rigid with the cover and bearing against said lever so as to bend said resilient arm bearing against the lower portion of the housing while resiliently keeping said lever in its locking position, the gap between said bosses being such that it enables said lever of pivoting on said lower boss when said lever is actuated by said release stud.

The locking means is free of any loop or hook so that loose locking means cannot catch with one another. For disposing the locking means in position it is only necessary to drop same into its recess, between the front surface and the inner auxiliary wall and upon the boss of the lower portion, and subsequently fit the housing cover, the bossd of this cover completing automatically the positioning of the bolt and the cocking of its resilient arm. This positioning can easily be performed in an automatic machine.

Preferably, the lever consists of a straight rod formed with a central V-shaped notch having a bottom rounded to a circular arc configuration corresponding to the rounded end of the lower, rib-shaped boss, said notch being closed laterally by a wall extending beyond the rod, between the lower boss and said inner auxiliary wall of the housing, for guiding said lever, said arm, which is rectilinear when unstressed, extending from the center of the lever by forming an angle of about 20° to about 30°.

One form of embodiment of the cassette according to the invention will be described by way of example with reference to the attached drawing.

DESCRIPTION OF THE DRAWINGS

FIG. 1 is a fragmentary front view of the cassette.

FIG. 2 is a fragmentary section taken along the line II—II of FIG. 1.

FIG. 3 is a fragmentary section taken along the line III—III of FIG. 1.

FIG. 4 is a fragmentary front view with a section taken along the line IV—IV of FIG. 2, before fitting the cover.

DESCRIPTION OF THE PREFERRED EMBODIMENT

Figure 5:
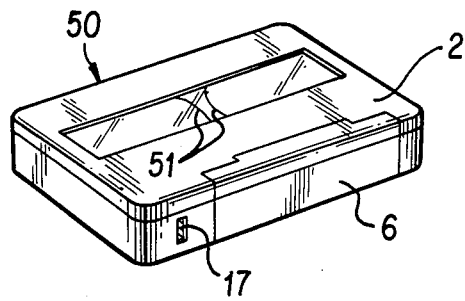
FIG. 5 is a perspective view of the cassette.

The cassette illustrated has the known configuration of a rectangular box consisting of a lower box-shaped portion 1 and of a cover 2 fitted on top of said lower portion 1 to which it is secured by means of a few screws 3. This cassette has a front surface 4 open on the major part of its surface so as to provide an aperture 5 constituting an access area to the magnetic tape carried by the pair of spools which are to be enclosed in the cassette. This access area 5 is normally closed by a flap 6 hingedly connected to the cover 2 by means of a horizontal hinge 7 (FIG. 3) and responsive to the action of a traction spring 8 urging said flap to its closed position in which it is coplanar with the front surface 4. This flap 6 has a known configuration and corresponds for example to the prior art as illustrated in the U.S. Pat. No. 4,323,207. It comprises at its base with a U-shaped bent portion 9 constituting the hooking portion cooperating with the bolt for constituting the means for locking the flap 6. The front surface 4 further comprises a window 10 through which the stud for releasing the recording-reading apparatus can be inserted.

The locking means consists of a straight lever 11 (FIG. 4) of polypropylene molded integrally with a rectilinear resilient arm 12 which is rectilinear when unstressed, this arm extending from the center of lever 11 and forming an angle of about 25° with this lever. The end of resilient arm 12 terminates with an injection point 13 which is utilized as a bearing and sliding point engaging the bottom of the cassette. The lever has formed intermediate its ends a V-shaped notch 14 having a rounded bottom of circular arc configuration, this notch 14 being closed on one side by a wall 15 parallel to said notch and extending beneath the lever 11. One arm of lever 11 has an oblique surface 16 cooperating with the hook 9 of the flap for automatically locking said flap, the other arm having an oblique surface 17 adapted to cooperate with the oblique surface of the release stud of the recording/reading apparatus. The lever 11 is mounted in a recess formed on one side by said front surface 4 and on the other side by an inner auxiliary wall 18 rigid with said portion 1. This portion 1 further comprises a rib-shaped boss 19 of which the rounded end engages the V-shaped notch of the lever. The lever 11 is held in this engaged position on boss 19 by a boss 20 formed integrally with cover 2 and having likewise a rounded end to permit a tilting by rolling of lever 11 on said boss 20. The lower portion 1 further comprises an inner auxiliary wall 21 parallel to said front surface 4 and connected to this front surface by means of a perpendicular wall 22 and an inner wall 23 also parallel to the front surface 4, rigid with the wall 18 slightly recesed with respect to this front surface, these walls completing the recess for receiving the locking means.

To position the locking means it is only necessary to introduce it firstly freely into its recess of the lower portion 1 by taking care that the end 13 of its resilient arm 12 be close to wall 22. The lever 11 will then slide with its right-hand portion on boss 19 whereby the notch 14 of lever 11 will engage automatically the boss 19. Then it is only necessary to fix the cover, the boss 20 thereof depressing the lever 11 to complete its engagement with boss 19 and bending slidhglty the resilient arm 12 acting as a return spring. The bolt is held in position laterally by its wall 15 projecting between the lower boss 19 and the auxiliary wall 18 of the housing (FIG. 2).

FIG. 5 shows cassette 50 illustrating reels 51, cover 2, flap 6 and window 17.

The operation of the locking means is obvious. When releasing the device, the release stud of the apparatus penetrates through the window 10 and exerts a downward force on portion 17 of lever 11. Thus, the lever pivots about the boss 19 and releases the hook 9 of flip 6. When locking the device, the flap hook 9 will lift the lever 11 by means of its oblique surface 16 and the lever 11 will pivot about boss 20, thus bending the resilient arm 12.

The invention of course is not limited by the specific form of embodiment described hereinabove but covers any variant thereof. More particularly, the lever may also be non-rectilinear and its resilient arm may be slightly curved. This lever may be fabricated from any other suitable material. The bosses 19 and 20 may have any other shape consistent with their functions and with the lever configuration.

What is claimed is:

1. In a video tape cassette of the type having a pair of spools supporting a magnetizable tape transferable from one spool to the other spool, a housing and locking means wherein the housing comprises a lower, box-shaped portion, a cover secured to said lower portion, and a flat front surface in which an aperture is formed to constitute an access area to the tape for recording or reading the tape, the aperture being closed by a flap hingedly mounted to one portion of said housing and having a hooking portion and being responsive to resilient means constantly urging said flap to its closed position, an inner auxiliary wall located in a forward portion of the housing rearward of the front surface and substantially parallel thereto, the locking means comprising a lever assembly, the front surface of the housing and an inner auxiliary wall defining a channel crossing a forward portion of the cassette, the lever assembly being disposed in said channel, the lever assembly being formed integrally with a resilient arm which is rectilinear when unstressed and bears against one portion of said housing, the resilient arm urging the lever assembly into engagement with the hooking portion of said flap, the lever assembly comprising a lever having an oblique surface on at least one end thereof for engaging with the flap to lock the flap closed, said front surface further comprising a window registering with said lever assembly for receiving an automatic release stud of a recording/reading apparatus, wherein said lever assembly consists of a lever affixed to the said lever, the lever being rotatably mounted within the channel and being held intermediate its ends between a first boss integrally mounted to said lower portion of the housing and acting as a fulcrum point for pivoting about an axis perpendicular to said front surface and a second boss formed integrally with said cover and bearing on said lever so as to bend the resilient arm, while resiliently keeping said lever in its closed position, the gap between said first and second bosses being such that said lever can tilt on the lower boss when said lever is actuated by said release stud.

2. A video cassette according to claim 1 wherein said lever consists of a rectilinear rod formed intermediate its ends with a V-shaped notch of which the bottom is rounded to a circular arc configuration corresponding to the rounded end of the second boss, which has a rib-shape, said notch being closed laterally by one wall extending beyond said rod, between said lower boss and said inner auxiliary wall of said housing for guiding said lever, said resilient arm, extending from the center of said lever so as to form an angle of from 20° to 30° therewith.

3. A video cassette of the type having a pair of spools supporting a magnetizable tape transferable from one spool to the other spool, having a housing and locking means comprising:
   a box-shaped cover;
   a lower box-shaped portion;
   a substantially flat front surface joining the cover to the lower portion and having an aperture providing access to the tape for recording/reading the tape;
   an auxiliary wall located in a forward portion of the housing, rearwardly of the front surface, and substantially parallel to the front surface, the auxiliary wall and the front surface combining to form a channel therebetween;
   a flap portion for closing the aperture in the front surface hingedly mounted to the cover and being responsive to resilient means constantly urging said flap to its closed position;
   a lever rotatably mounted in the channel, the axis of rotation being perpendicular to the front surface, the lever having a catch portion for engaging a portion of the flap to maintain the flap in a closed position, further comprising a first boss integrally mounted to said lower portion of the housing and acting as a fulcrum point for pivoting about the axis, and a second boss formed integrally with said cover and bearing on said lever so as to bend the resilient arm, while resiliently keeping said lever in its closed position, the gap between said first and second bosses being such that said lever can tilt on the lower boss when said lever is actuated by said release stud.

4. A video tape cassette according to claim 3 wherein the lever has a first side and a second side defined by the axis of rotation, the first side having an oblique surface on at least a portion of said first side wherein said portion is adapted to align with the aperture in the front surface, said oblique surface adapted to rotate the lever in response to contact by an automatic release stud of a recording/reading apparatus inserted through the aperture, the second side of the lever having a catch portion adapted to engage a portion of the flap to maintain the flap in a closed position;

a resilient arm affixed to the lever and bearing against a portion of the housing for urging the lever assembly into engagement with the flap.

* * * * *